United States Patent [19]

Nishimura et al.

[11] Patent Number: 4,832,466
[45] Date of Patent: May 23, 1989

[54] OPTICAL ELEMENT

[75] Inventors: Yukuo Nishimura, Sagamihara; Satoshi Yuasa, Yokohama; Masahiro Haruta, Tokyo; Yoko Yoshinaga, Machida; Hirohide Munakata, Yokohama, all of Japan

[73] Assignee: Canon Kabushiki Kaisha, Tokyo, Japan

[21] Appl. No.: 850,172

[22] Filed: Apr. 10, 1986

[30] Foreign Application Priority Data

| Apr. 13, 1985 | [JP] | Japan | 60-77570 |
| Apr. 30, 1985 | [JP] | Japan | 60-91025 |
| Jun. 3, 1985 | [JP] | Japan | 60-118770 |
| Jun. 18, 1985 | [JP] | Japan | 60-130697 |
| Jul. 2, 1985 | [JP] | Japan | 60-143973 |

[51] Int. Cl.$^4$ ............................................. G02F 1/01
[52] U.S. Cl. ..................................... 350/354; 350/353
[58] Field of Search ................ 350/353, 354, 362, 363

[56] References Cited

U.S. PATENT DOCUMENTS

| 3,355,294 | 11/1967 | Giddings | 96/90 |
| 4,169,661 | 10/1979 | Yamada et al. | 350/353 |
| 4,307,942 | 12/1981 | Chahroudi | 350/353 |
| 4,536,061 | 8/1985 | Nishimura | 350/354 |

Primary Examiner—Eugene R. Laroche
Assistant Examiner—Nathan W. McCutcheon
Attorney, Agent, or Firm—Fitzpatrick, Cella, Harper & Scinto

[57] ABSTRACT

An optical element comprises a pair of plates between which an optical modulation liquid layer is sandwiched, the optical modulation liquid layer exhibiting a light scattering property caused by suspension of fine particle polymer when heated and exhibiting transparency caused by dissolution of fine particle polymer when not heated, the change of such light scattering property to transparency being reversible.

9 Claims, 13 Drawing Sheets

FIG. 16
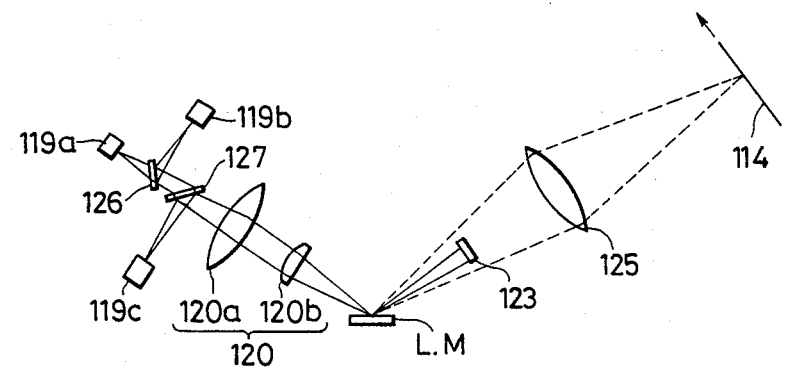
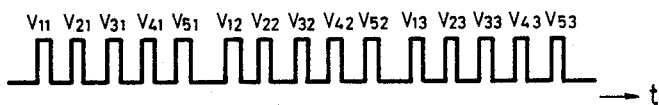
FIG. 17A
FIG. 17B
FIG. 17C
FIG. 17D

OPTICAL ELEMENT

BACKGROUND OF THE INVENTION

1. Field of the Invention

This invention relates to a novel optical element, and more particularly, to an optical element employing a light scattering property of a soluble polymer.

2. Description of the Related Art

Recent development of office automation (OA) leads to a popularization of display devices in the field of business machines. Display devices are desired which do not cause fatigue of eyes of operators of the device even after a long time period of operation. There have been known non-luminant type of display elements such as an electric-field-induced coloring display devices (ECD), and liquid crystal display devices (LCD) as a display element.

Disadvantages are encountered, however, that an ECD cannot exhibit a sufficient contrast of display and that an LCD cannot give a sufficiently large visual field angle. The similar disadvantages are encountered in these devices when the devices are employed as a light modulation element such as a light shutter.

SUMMARY OF THE INVENTION

The present invention overcomes the above-mentioned drawbacks of conventional elements.

A primary object of the present invention is to provide an element of high quality which has a wide visual field angle as a display device, is excellent in clearness and does not cause fatigue of eye, and also a light modulation element which exhibits high contrast and has a low dependency on light incident angle.

The object of the present invention has been achieved by an optical element comprising a pair of plates between which an optical modulation liquid layer is sandwiched, the optical modulation liquid layer exhibiting a light scattering property caused by suspension of fine particle polymer when heated and exhibiting transparency caused by dissolution of fine particle polymer when not heated, the change of such light scattering property to transparency being reversible.

BRIEF DESCRIPTION OF THE DRAWINGS

FIGS. 16 and 17 illustrate examples of a modulation apparatus for color image forming light;

DETAILED DESCRIPTION OF THE PREFERRED EMBODIMENTS

Figure 1:
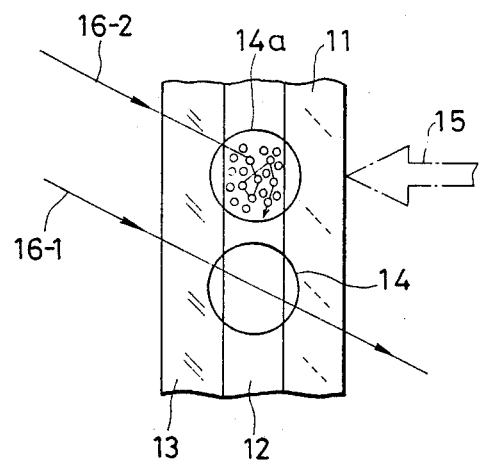
FIGS. 1-4 illustrate constructions showing the basis of the present invention.

The basic construction of the present invention is explained referring to FIG. 1. In FIG. 1, the numeral 11 indicates a substrate, 12 an optical modulation liquid layer, and 13 a transparent protective plate. The substrate 11 is made from a transparent material such a glass and plastics for light transmissive type of optical element, and an opaque material such as semiconductors like silicon, ceramics, metals like aluminum, and opaque plastics, or above-mentioned transparent materials on which a metallic film is vapor-deposited. Optical modulation liquid layer 12 is composed of a solvent containing a soluble polymer. As the soluble polymer constituting the polymer liquid layer, there may be mentioned preferably polymers made of hydrophilic monomers such as N-isopropylacrylamide, methyl vinyl ether, ethylene oxide, propylene oxide and the like, or copolymers thereof or copolymers containing them as a main component and the like.

On the other hand, as a liquid constituting the polymer liquid layer, there may be preferably mentioned water, an organic solvent, for example, alcohols such as methanol, ethanol, ethyleneglycol, glycerine and the like, ketones such as acetone, methyl ethyl ketone, and the like, amides such as dimethylformamide, hexamethylphosphoramide, dimethyl acetamide and the like, amines such as pyridine, triethylamine and the like, and sulfur containing solvents such as dimethyl sulfoxide and the like, or a mixture of water of the organic solvent, or a solution formed by adding a solute such as potassium chloride, sodium chloride, urea and the like to the solvent.

The thickness of polymer liquid layer 12 is preferably 1–1000 $\mu$m, more preferably 1–100 $\mu$m.

As the transparent protective plate 13, there may be mentioned a transparent member such as glass, plastics, dielectric members and the like. In order to improve the contrast, the surface of substrate 11 may be provided a visible light reflecting layer and a visible light absorbing layer (not shown).

The principle of operation of the optical element (imaging and light modulation) will be explained using FIG. 1, which shows an example of the reflection type.

First, where optical modulation liquid layer 12 is not warmed (i.e., at a low temperature state), the soluble polymer is dissolved into a solvent so that the light 16 - 1 incident on the low temperature region 14 of optical modulation liquid layer 12 passes through optical modulation liquid 12 as it is, and then goes out from transparent protective plate 13.

On the other hand, in the case where a predetermined position in optical modulation liquid layer 12 is warmed according to an information signal, for example, by an external heating means such as irradiation of infrared ray beam 15, the soluble polymer in the warmed region is precipitated resulting in exhibiting a light scattering property.

Therefore, light 16 - 2 incident on the warmed region 14a is scattered (diffused). When the temperature at the warmed region 14a is lowered, the region 14a becomes transparent again.

As is clear from the above, the feature of the present invention is that light modulation and display are effected by thermally controlling scattering (opaque) and non-scattering (transparent) in an optical modulation liquid layer.

Figure 2:
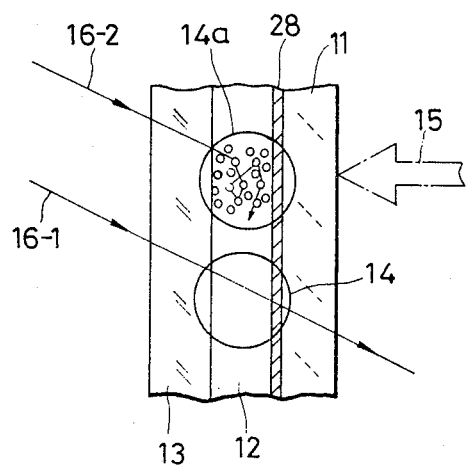

FIG. 2 illustrates a preferred embodiment of the present invention, where symbols 11 to 16 are the same members as in FIG. 1.

As a heat generating element of an infrared-ray absorbing layer 28, there may be used, for example, the infrared ray absorbing layer when heating by absorbing infrared ray is utilized as the heating means. The infrared ray absorbing layer 28 can be produced by forming a film of various known inorganic or organic materials which themselves are not easily melted. Such material includes preferably Si, SiO, $SiO_2$, ZnS, $As_2S_3$, $Al_2O_3$, NaF, ZnSe, Gd.Tb.Fe, carbon black, metal phthalocyanine and the like. The thickness of the infrared ray absorbing layer 28 is preferably 500 Å–10000 Å.

As a transparent protective plate 13, there may be used a transparent member composed of glass, plastics, dielectric substance or the like. In order to improve contrast, a visible ray reflecting layer or visible ray absorbing layer (not shown) may be provided on substrate 11.

The principle of performance of the optical element (imaging and light modulation) will be explained referring to FIG. 2 showing an example of a transparent type.

First, when optical modulation liquid layer 12 is not yet warmed (that is, at a low temperature), the soluble polymer is dissolved into a solvent, and therefore, light 16 - 1 incident on a low temperature region 14 of optical modulation liquid layer 12 passes through optical modulation liquid layer 12 and goes out of substrate 11 as it is. On the other hand, when a predetermined position of infrared ray-absorbing layer 28 is heated in accordance with an information signal, for example, externally heated by irradiation with infrared ray beam 15, the optical modulation liquid layer at the region contacting or contiguous to the heated portion is also warmed so that the soluble polymer in the warmed region 14a is precipitated resulting in exhibiting light scattering. Therefore, light 16 - 2 incident on a warmed region 14a is scattered. The warmed region 14a returns to the original transparent state when the temperature is lowered.

As is clear from the above-mentioned explanation, the present invention is concerned with light modulation and display effected by thermally controlling scattering (opaque) and non-scattering (transparent).

According to a further preferred embodiment of the present invention, there is provided the optical element being fundamentally constituted of a substrate, a transparent protective plate placed at a constant distance from the substrate, and a light modulation member provided between the substrate and the transparent protective plate. The light modulation member comprises a solvent, a polymer formed in the solvent and a light absorbing heat generating agent. The polymer is precipitated from the polymer solution when heated while it is dissolved in the solution when cooled.

According to a still further embodiment of the present invention, there is provided an optical element comprising:

a. a pair of plates;

b. an optical modulation liquid layer exhibiting a light scattering property caused by a polymer emulsion containing suspended fine particle polymer formed when heated and exhibiting transparency caused by a polymer solution to which fine particle polymer is dissolved when not heated, the change of such light scattering property to transparency being reversible; and c. a heating means for selectively heating the optical modulation liquid layer.

As the light absorbing heat generating agent used in the present invention, there may be used any material capable of selectively absorbing a light of a certain wavelength to generate heat and being dissolved in the above-mentioned solvent. Such materials are easily commercially available as various organic colorants, inorganic colorants, organic salts, inorganic salts, UV absorbers, IR absorbers, and the like. In the present invention, there may be used the material selected appropriately. Preferable example is IR absorbers, for example, where the solvent is an aqueous solvent, metal salts such as copper sulfate, nickel sulfate and the like are preferred, and where the solvent is an organic material, organic IR absorbers such as IRG - 003 (tradename, supplied by Nihon Kayaku K.K.) and the like are preferred. In addition, as other examples of IR absorbers, there may be mentioned cyanines, xanthene derivatives, thiapyrylium salt derivatives, pyrylium salt derivatives and the like.

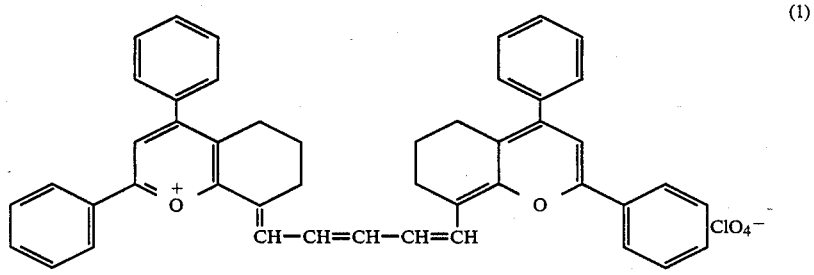

(1)

$\lambda$ max = 1,040 nm    $\epsilon = 125 \times 10^3$

-continued

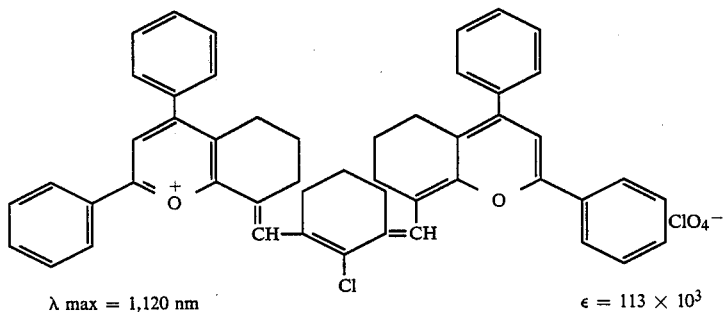

(2)

λ max = 1,120 nm    ε = 113 × 10³

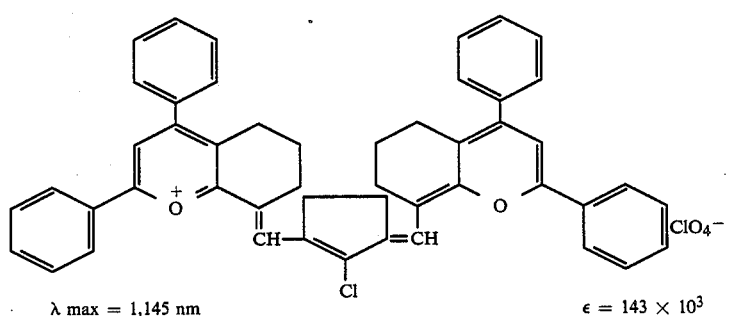

(3)

λ max = 1,145 nm    ε = 143 × 10³

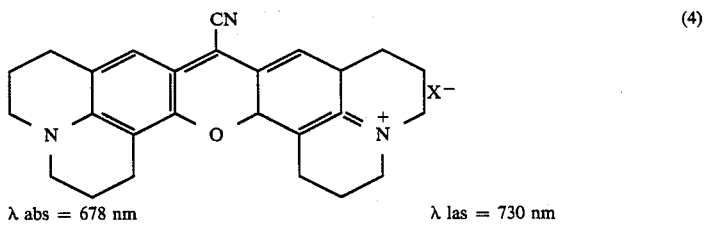

(4)

λ abs = 678 nm    λ las = 730 nm

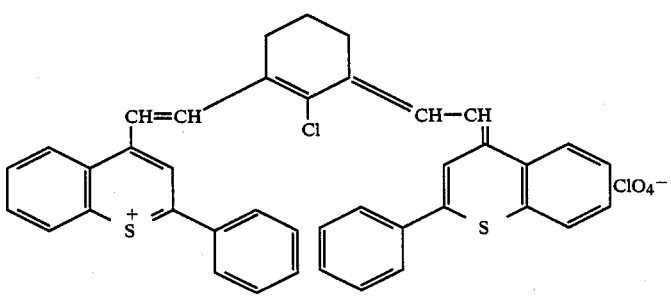

(5)

The light absorbing heat generating agent is to be selected such that the agent can be preferably combined with a polymer and a solvent contained in a polymer solution. In general, the light absorbing heat generating agent is dissolved at a concentration of about $10^{-5}-10^{-2}$M and used though it varies depending on the relation with the solvent and the polymer gel to be combined therewith. The light absorbing heat generating agent is preferably added upon forming the polymer solution.

The optical element of the present invention is fundamentally constituted of the above-mentioned materials, and in addition, in order to improve the contrast of the resulting optical image, there may be combined with conventional techniques such as providing a visible light reflecting member, a visible light absorbing layer or the like. The method of fabricating the optical element such as laminating a transparent protective plate, a polymer solution layer and a substrate, may be that of known techniques.

The present invention will be further explained referring to the drawing illustrating preferred embodiments of the optical element according to the present invention.

Figure 5:
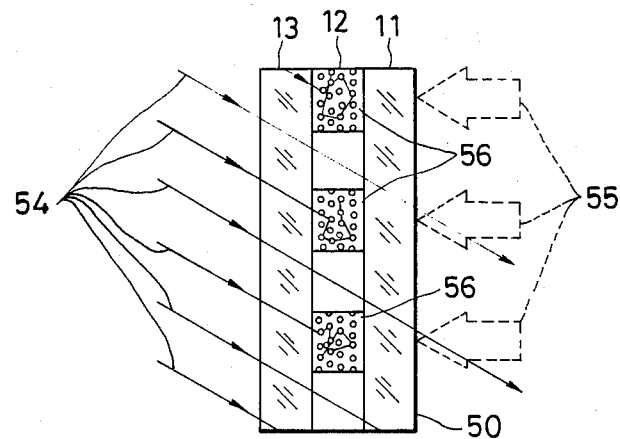
FIG. 5 illustrates a light transmission type of optical element of the present invention.
Figure 6:
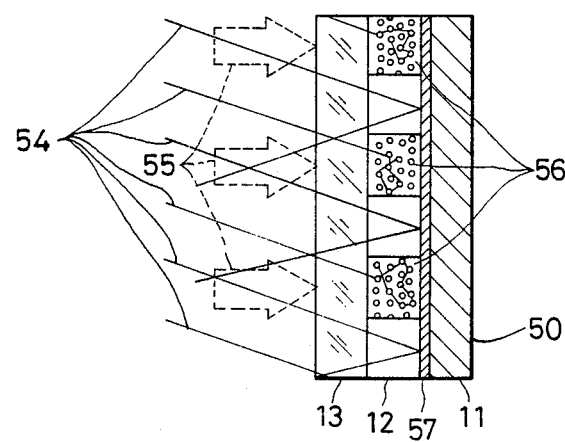
FIG. 6 illustrates a light reflection type of optical element of the present invention.

FIG. 5 shows diagrammatically an optical element of a light transmission type according to the present invention and FIG. 6 an optical element of a reflection type according to the present invention.

In FIG. 5, an optical element 50 of a light transmission type is constituted of the above-mentioned transparent plate 11, optical modulation liquid layer 12 and transparent protective plate 13. In case that a light beam 54 having a wavelength not absorbed by the light absorbing heat generating agent present in polymer optical modulation liquid layer 12 (non-absorbed light) is projected to optical element 50, the non-absorbed light 54 passes through optical element 50 almost as it is and goes out of substrate 11.

On the contrary, when a light beam 55 which is absorbed by the light absorbing heat generating agent (absorbed light) is projected to the optical element, the light absorbed to the light absorbing heat generating agent uniformly present in the polymer solution layer generates heat by which the polymer solution is heated resulting in, for example, that the polymer is precipitated to form a light scattering portion 56 and scatter the non-absorbed light 54. Therefore, when the non-absorbed light 54 is projected to the whole surface and an absorbed light 55 is projected as an information light in a form of an optional pattern from the same direction or from the opposite side of the optical element 50, there is formed an image 56 following the information source.

In FIG. 5, an image display is diagrammatically shown in which as a light absorbing heat generating agent, there is used an infrared ray absorber and as a non-absorbed light 54, there is used a white light beam and as an absorbed light 55, there is used as infrared ray.

FIG. 6 shows diagrammatically an embodiment of a reflection type where a light reflection layer 57 is provided on the surface of a substrate, and the principle of performance is the same as that in FIG. 5 except that non-absorbed light 54 is reflected.

In the above, as a light absorbing heat generating agent, an infrared ray absorber is used, but in the case where, in place of the infrared ray absorber, there are used various colorant capable of absorbing a light beam of a specified wavelength and generating heat or a UV absorber absorbing ultraviolet ray and generating heat, and a light which is not absorbed by the light absorbing heat generating agent is used simultaneously, it will be clear that various optical displays can be effected by the same principle of performance as that in the above-mentioned embodiment.

According to a still further preferred embodiment of the present invention, there is provided a flexible optical element comprising a substrate, a light modulation member and a transparent protective plate, said light modulation member comprising a polymer liquid containing a solvent and a polymer, said polymer liquid becoming light scattering when heated and becoming transparent when cooled.

As the substrate and the transparent protective plate primarily characterizing the present invention, any of known flexible materials can be used as far as the materials is inert to a solvent constituting a polymer liquid mentioned later. For example, when the optical element is of a light transmission type, there may, for both of the substrate and the transparent protective plate, be used a transparent plastic material such as polyolefines, polyesters, polyacrylic acid esters, polyurethans, polyamides, polycarbonates and the like, and when the optical element is of a light reflection type, there may be optionally used the above materials for the transparent protective plate, and for the substrate there may be optionally used materials through which light can not pass, for example, metallic films such as aluminum and like, and opaque plastics, or the above-mentioned transparent materials on which a metallic film is vapor-deposited. Both of the substrate and the transparent protective plate are preferably about 0.01–0.4 mm thick in case of the light transmission type or reflection type regardless of the shape.

The polymer liquid, which characterizes the present invention and is used therein, is composed of a suitable organic solvent or water, or a mixture thereof and a soluble polymer thereto.

These liquids of the present invention include a polymer liquid in which a polymer is dissolved at normal temperature, and a polymer gel formed by that the polymer absorbs and retains a solvent.

Such polymer and solvent have been known. However, the polymer liquid used in the present invention is necessary to exhibit transparency at a certain range of temperature and to exhibit a light-scattering property above the range of temperature since a polymer or a polymer gel is precipitated.

Preferred examples of the above polymers include: polyethers such as random and block copolymers of polyethylene glycol and polypropylene glycol with alkylene oxides such as ethylene oxide, propylene oxide and the like; polyvinyl compounds such as polyvinyl methyl ether and the like; poly(meth)acrylamides such as poly(meth)acrylamide [the term "(meth)acryl" means both of "acryl" and "methacryl" in this specification], poly N-isopropyl(meth)acrylamide, poly N,N-diethyl(meth)acrylamide, poly N-ethyl(meth)acrylamide, poly N-propyl(meth)acrylamide, poly N-cyclopropyl(meth)acrylamide, poly N-ethyl-N-methyl(meth)acrylamide, poly N-(meth)acryloyl pyrrolidine, poly N-(meth)acryloyl piperidine and the like; copolymers including, as a main component, at least one or more of the monomers constituting the polymer material; or a mixture thereof.

In addition to the above polymers capable of forming a solution, there can be used polymers as described above which have very high molecular weights and absorb and retain a solvent to form gels, and crosslinked polymers which are produced by crosslinking the above polymers. When gel of a crosslinked polymer used causes a reversible change "transparent⟵⟶light scattering", the same effects as in the foregoing polymers are obtained.

Such crosslinked structure can be easily formed by various known methods, for example, a method where upon producing the polymer, a polyfunctional monomer is partly used as a crosslinking agent to form a crosslinked structure simultaneously with polymerization; a method where a reactive monomer is also used to form crosslinking points in a polymer and a crosslinked structure is produced utilizing the crosslinking points; and a method where crosslinking is caused by using radiation or the like.

As a solvent used for forming organic polymer liquid by the above-mentioned polymers there may be mentioned known organic solvents, water or mixtures thereof, for example, water, alcohols such as methanol, ethanol, propanol, ethylene glycol, glycerol and the like, ketones such as acetone, methyl ethyl ketone and the like, ethers such as dioxane, diglyme, tetrahydrofuran and the like, amides such as dimethyl formamide, dimethyl acetamide, and the like, sulfur-containing solvents such as dimethyl sulfoxide and the like, or mixtures thereof. In addition, there may be mentioned solutions composed of the above-mentioned solvents in which a solute such as an electrolyte, for example, acids, bases, salts and the like, urea, glucose and the like is dissolved.

The polymer liquid used in the present invention can be formed from the above-mentioned polymer and a solvent. An important point is the combination of the polymer and the solvent, and the combination is to be such that the polymer can form a transparent solution or gel and the resulting solution or gel is precipitated at a temperature which is not so high, preferably about 20°–100° C. by heat absorption, which causes light scattering.

The present inventors have found that, upon formation of polymer gel, if a polymer and a solvent are appropriately combined so that, for example, a critical dissolution temperature of the polymer in the solvent (the critical dissolution temperature corresponds to Flory temperature $\theta$ of a single polymer in a simple solvent) may be within 5° to 100° C., preferably 20° to 75° C., the polymer is precipitated and a light scattering property appears by change in temperature, that is, temperature rise, and further found that the polymer liquid is formed into, for example, a thin layer of about 1–1,000 $\mu$m, preferably 1–100 $\mu$m and when heat is applied partly to the thin layer, the heated portion immediately becomes of light scattering property, while when heat is removed, the light scattering portion is immediately eliminated. In addition, it has been found that the very excellent heat response, that is, dissolution (transparency)$\leftrightarrow$precipitation (light scattering), is useful as a light modulation member of a light modulation apparatus.

In addition, such polymer liquid can be freely deformed, and hence the light modulation element can be rendered flexible by utilizing the liquid and flexible materials for a substrate and a transparent protective plate. When this light modulation member is used, there can be obtained a light modulation apparatus free from various drawbacks.

The polymer liquid having such an excellent heat response can be easily formed by selecting a solvent suitable for the selected polymer and controlling the solvent affinity of the polymer.

Further, the heat response of a polymer liquid can be controlled to a desired range by once forming an organic polymer solution or a transparent polymer gel, for example, by using a relatively good solvent and then mixing a relatively poor solvent thereto to change an affinity of the polymer to a solvent, by using a solvent mixture of various mixing ratio, or by using a solvent to which a variety of solutes are added.

The light modulation member used in the present invention, that is, an organic polymer gel thin layer may be produced by forming a polymer liquid having a concentration of organic polymer of about 0.2–20% and forming the polymer liquid into a thin layer having about the above thickness between a transparent protective plate and a support. When the concentration of the polymer is below the above-mentioned range, change of optical properties of the light modulation element becomes smaller, while when the concentration is above the range, its speed of response becomes lower. Therefore, it is preferred that the concentration is within the range.

Since the present optical element is flexible, it can be used in a bent state. When the element is bent, it is also preferred to allow a suitable spacer to be included between a substrate and a transparent protective plate. Preferable examples of such spacers include porous film materials such as paper, nonwoven fabric and the like.

Such a spacer is not needed if the thickness of the polymer liquid layer will not change.

The present optical elements requires a means for heating a polymer liquid layer according to information signals. It is preferred that such heating means is incorporated in the element. The means can also be attached to the element upon its use. As the heating means, any of means known for heating can be used. Preferable examples of such means are resistive heat-generating materials which generate heat, based on electric resistance, and heating materials which generate heat by absorbing infrared ray. As the resistive heat-generating layer, there can be used: metals such as nichrome and the like; alloys; transparent or opaque metal compounds such as hafnium boride, tantalum nitride, tin oxide, indium tin oxide and the like; and electroconductive plastics such as carbon resins, metal-dispersed plastics and the like.

An infrared-ray-absorbing layer can be made of inorganic or organic materials which absorb radiation having desired wavelength, for example, Si, SiO, $SiO_2$, ZnS, $As_2S_3$, $Al_2O_3$, NaF, ZnSe, Cd.Tb.Fe, carbon black, metal phthalocyanines, pigments and the like. The optical element of the present invention is basically constituted of the above-mentioned materials. In addition, an insulating layer can be preferably provided on a surface of the heating means of the element in order to protect the heating means from polymer liquid. As materials for the insulating layer, there can be used, for example, polymeric materials containing any of methyl methacrylate, butyl acrylate, styreneacrylonitrile copolymer, polyesters, polyamides and the like, which are not soluble to a solvent constituting a polymer liquid layer. Further, the insulating layer can be colored in order to control a contrast in a run of the optical element. The element can also have a pigmented layer apart from the insulating layer for the same purpose as above. When provided with the insulating layer and/or the pigmented layer, it is necessary that a distance from the resistive heat-generating layer or the infrared-ray-absorbing layer to the polymer liquid layer is not more than 500 $\mu$m, preferably 100 $\mu$m in order not to prevent rapidly heat transportation. Further, as a method for constituting the optical element, that is, for laminating a transparent protective plate, a polymer liquid layer, heat-generating layer, an insulating layer, a substrate and the like, there can be used any known method.

The present invention will be further explained referring to the drawing illustrating preferred embodiments of the optical element according to the present invention.

Figure 7:
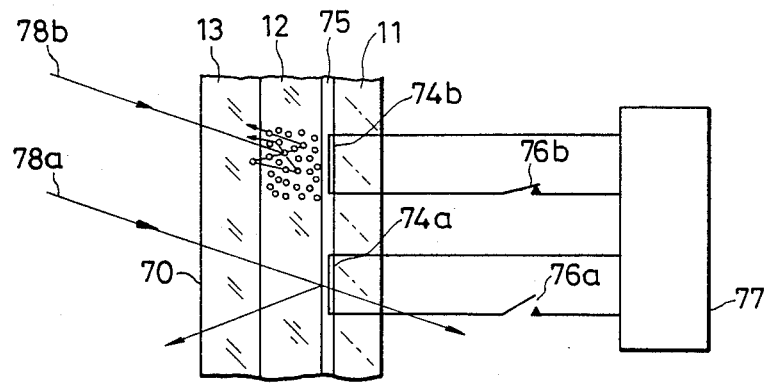
FIG. 7 shows a sectional view of an optical element of the present invention.
Figure 8:
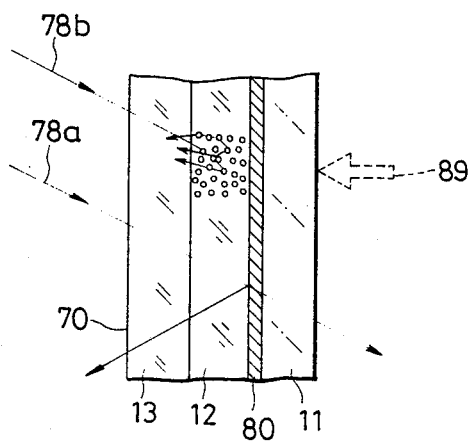
FIG. 8 shows another sectional view of an optical element of the present invention.

FIG. 7 shows diagrammatically a preferred optical element of a light transmission type a reflection type according to the present invention and FIG. 8 an another optical element according to the present invention.

In FIG. 7, an optical element 70 is constituted of the above-mentioned flexible substrate 11, optical modulation liquid layer 12 and flexible transparent protective plate 13. The above-mentioned substrate 11 is provided with resistive heat-generating layers 74a, 74b, . . . as a preferable means for heating a light modulation liquid layer 12, and an insulating layer 75 for protecting these resistive heat-generating layers from a solvent in a polymer liquid layer. The resistive heat-generating layers are connected to an external power source 77 through switches or elements 76a, 76b . . . which act similarly to switches.

In the above optical element, when a switch is opened (76a), electric power is not supplied to the resistive heat-generating layer 74a, temperature of the light modulation liquid layer 12 adjacent thereto is low, and hence the layer 12 is a transparent and homogeneous state in which a polymer has an affinity for a solvent. Accordingly, when the present optical element has the construction of a light transmission type, incident light 78a goes straightly and then goes out from a back side of the element as it is. When the present optical element has the construction of a light reflection type, incident light is absorbed according to optical properties of the resistive heat-generating layers 74a, 74b . . . , the insulating layer 75, the pigmented layer (not shown) and the like.

On the other hand, when a switch is closed (76b), electric power is supplied to the resistive heat-generating layer 74b by the external power source 77, and heat generated in the resistive heat-generating layer 74b allows temperature of the optical modulation liquid layer 12 adjacent thereto to be raised. As the result, when liquid temperature exceeds critical temperature of a polymer, the polymer is precipitated in a liquid medium, its polymer-precipitating portion of the optical modulation liquid layer 12 becomes heterogeneous, and then incident light 78b is remarkably scattered in the layer 12. Thus, desired light modulation and display are achieved.

FIG. 8 shows schematically an embodiment that an infrared-ray-absorbing layer 80 in place of resistive layers 74a, 74b . . . of the embodiment in FIG. 7 is provided as a heating means on a surface of the substrate, the layer 80 absorbing infrared ray 89 to generate heat. A working principle in this embodiment is the same as in FIG. 7 except for utilizing infrared ray for an electric heating source. According to this embodiment, it is similarly effective that a side of the transparent protective plate is irradiated with infrared ray in a form of a pattern.

Furthermore, substituting for the heating means in FIGS. 7 and 8, there can be used a variety of pigments which absorbs light having specific wavelength to generate heat, and ultraviolet-ray-absorbing agent which absorbs ultraviolet ray to generate heat. They can be previously added to an optical modulation liquid layer 12, and thus light not absorbed by these light-absorbing heat-generating agent can be utilized simultaneously. Although such an embodiment is not shown, it is evident that a variety of optical displays and light modulation can be achieved.

Examples of the present invention are illustrated according to the Figures.

EXAMPLE 1

As a substrate 11 and a transparent protective plate 13, there was used a sufficiently cleaned glass of 0.3 mm thick and 50 mm × 10 mm in size for each. The two glass plates were faced to each other at a distance of 10 $\mu$m using a Mylar film as a spacer and adhered to for a cell.

N-isopropyl acrylamide 5.0 g, ammonium persulfate 30 mg is dissolved in a cold water 100 ml, followed by adding 60 ml of tetramethylethylenediamine. The mixture was subjected to deaeration by an aspirator and then polymerization by standing for 30 min. at room temperature to form a polymer solution. The resulting polymer solution was charged in the cell followed by sealing. Thus an optical modulation liquid layer 12 was formed. Thus an optical element was produced.

The resulting optical element was irradiated in a manner of scanning with a semiconductor laser beam of output of 20 mW and wavelength of 830 nm in accordance with information signals. The laser beam was focussed on the optical modulation liquid layer 12 from the back side of the optical element. As a result, a predetermined portion of optical modulation liquid layer 12 turned from transparent into opaque It is considered that the semiconductor laser beam was absorbed at the irradiated region of the optical modulation liquid layer 12 and converted to heat.

The heating by the semiconductor laser beam was effected only in a moment, and then the optical modulation liquid layer 12 immediately returned to a transparent state.

The above-mentioned irradiation experiment by the laser beam was repeated and it was found that the reproducibility and signal response were practically satisfactory.

EXAMPLE 2

N-isopropyl acrylamide 4 g, and hydroxyethyl methacrylate 0.5 g were dissolved in 100 ml of a cold water and further ammonium persulfate 30 mg was dissolved therein, and then tetramethylethylenediamine 60 ml was added followed by deaerating by an aspirator.

The resulting solution was polymerized by standing for 30 min. at room temperature to form a polymer solution. An optical element was produced in a manner similar to the procedures in Example 1 except for using this soluble polymer for an optical modulation liquid layer.

The resulting optical element was subjected to imaging and light modulation as in Example 1 and there was obtained a good result similar to that in Example 1.

EXAMPLE 3

Polypropylene oxide (average molecular weight 400, supplied by Kishida Kagaku) 5.0 g was mixed with 50 ml of water to form a polymer solution. An optical element was produced in a manner similar to in Example 1 except for using this soluble polymer for an optical modulation liquid layer.

The resulting optical element was subjected to an experiment of imaging and light modulation as in Example 1, and there was obtained a similar good result.

In the above-mentioned examples, optical elements of transparent type are explained, but optical elements of reflection type also can give characteristics similar to those of transparent type.

Since the optical element according to the present invention is excellent in scattering characteristics, there can be obtained clear images of high contrast and high resolution, and limitation of visual field angle can be eliminated. Therefore, even when the optical element is used as a display device for a long time, fatigue of eye is not caused. Further, the optical modulation liquid layer is modulated by a slight heating, and therefore, the power consumption of the display device can be saved. Further, high frequency modulation is possible.

EXAMPLE 4

FIG. 2 schematically shows the constitution of an embodiment of the present invention. In FIG. 2, as substrate 11 and transparent protective plate 13, sufficiently cleaned glass plates each of which is 0.3 mm in thickness and 50 mm × 10 mm in size were used. A Gd.Tb.Fe (gadolinium.terbium iron) layer of 1500 Åthick was formed on the surface of the glass plate of substrate 11 by sputtering to produce an infrared ray absorbing layer 28. The surface of infrared absorbing layer 28 of substrate 11 and the transparent protective plate 13 were placed to face each other at a distance of 10 μm using a Mylar film as a spacer and adhered. Then N-isopropyl acrylamide 5.0 g and ammonium persulfate 30 mg were dissolved in 100 ml of cold water, followed by adding 60 μl of tetramethylethylenediamine. Then the mixture was subjected to deaeration by an aspirator and polymerized by standing for 30 min. at room temperature to form a polymer solution.

The resulting polymer solution was charged in the space between substrate 11 and transparent protective plate 13 and sealed to form an optical modulation liquid layer 12. Thus an optical element was produced.

The resulting optical element was irradiated in a manner of scanning with a semiconductor laser beam of output of 20 mW and wavelength of 830 nm in accordance with information signals. The laser beam was focused on the infrared ray absorbing layer 28 from the back side of the optical element. As a result, a predetermined portion of optical modulation liquid layer 12 turned from transparent into opaque. This is considered that the semiconductor laser beam was absorbed at the irradiated region of the optical modulation liquid layer 12 and converted to heat, and then a polymer liquid portion contacting the irradiated portion is heated. The heating by the semiconductor laser beam was effected only in a moment and then the optical modulation liquid layer 12 immediately returned to a transparent state.

The above-mentioned irradiation experiment by the laser beam was repeated and it was found that the reproducibility and signal response were practically satisfactory.

EXAMPLE 5

Methacrylamide 0.5 g, and ammonium persulfate 50 mg were dissolved in 30 ml of a cold water, and then tetramethylethylenediamine 30 μl was added followed by deaerating by an aspirator. After standing for 30 min. at room temperature, to the mixture was added methanol 25 ml. Then the mixture was heated to 60° C. to form a polymer solution. The resulting solution was used as a polymer solution in a manner similar to the procedures in Example 4 above to produce an optical element.

The resulting optical element was subjected to imaging and light modulation as in Example 4 and there was obtained a good result similar to that in Example 4.

EXAMPLE 6

Figure 3:
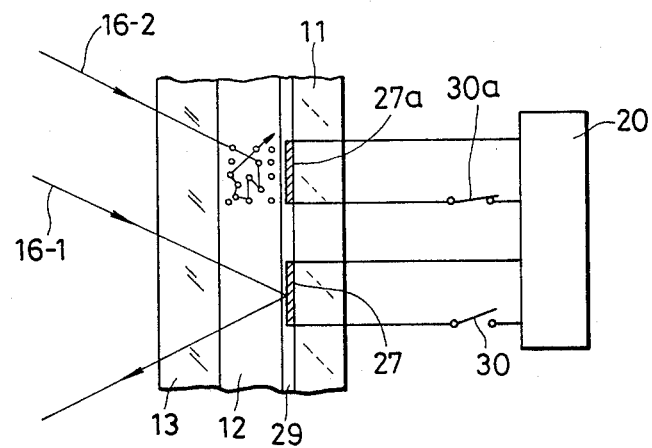

FIG. 3 shows schematically a further embodiment of the present invention. In this Example 6, as a heat generating element, a resistive heater layer 27 was provided on the surface of substrate 11 in place of an infrared-ray-absorbing layer 28 used in Examples 4 and 5, and heating of the resistive heater layer 27 was controlled by the electric current from power source 20. This Example 6 is concerned with a reflection type.

As the material for resistive heater layer 27, there may be used, for example, metal compounds such as hafnium boride, tantalum nitride and the like, alloys such as nichrome and the like, transparent oxides such as ITO (Indium Tin Oxide) and the like. The thickness of resistive heater layer is preferably 500–5000 Å. An insulating layer (protective layer) 29 is formed on the surface of resistive heater layer 27 and between optical modulation liquid layer 12 and resistive heater layer 27.

Referring to FIG. 3, a switch 30 connected with a resistive heater 27 is off so that electric current does not flow to the resistive heater layer 27. Therefore, the incident light 16 - 1 substantially passes an optical modulation liquid layer 12 as it is and then is normally reflected on the surface of the resistive heater layer 27 and passes optical modulation liquid layer 12 again and goes out of a transparent protective plate 13.

On the other hand, a switch 30a connected with resistive heater layer 27a is on so that resistive heater layer 27a is heated with electric current from a power source 20. Thus, the incident light 16 - 2 is scattered as mentioned above.

As mentioned above, when resistive heater layer 27 is used as a heat generating element in place of infrared-ray absorbing layer 28, the effect is the same as that when infrared ray absorption layer 28 is used, and therefore the element using resistive heater layer 27 can be used as an optical element to effect imaging and light modulation.

Figure 4:
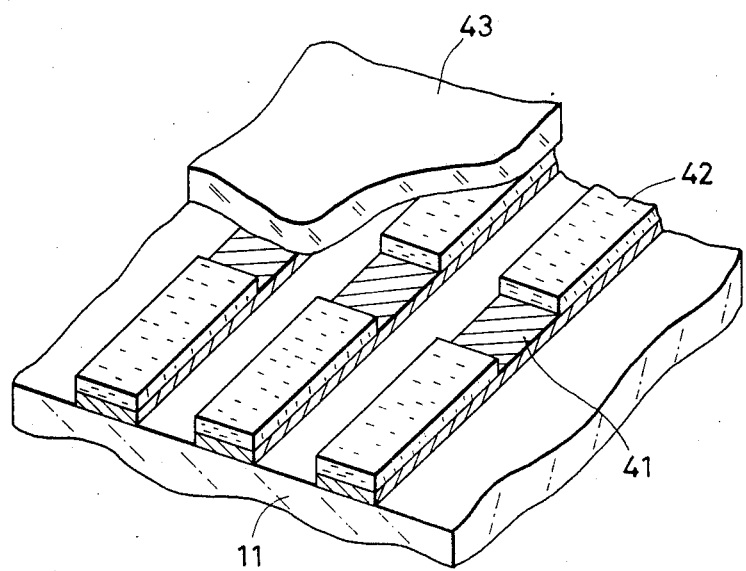

Referring to FIG. 4, an oblique view of a further example of the substrate of the present invention is shown. In this example, substrate 11 and transparent protective plate 13 are the same as those used in Example 4.

In FIG. 4, on the surface of substrate 11 was formed a tantalum nitride film of 1000 Å thick by sputtering, and then a photoresist was applied to the film surface to form 20 lines/mm of stripe-like pattern parallel to the short side (10 mm) of substrate 11. Then, unnecessary tantalum nitride film was selectively removed by etching and the remaining portions were used as resistive heater layer 41. An ITO film of 2000 Å thick was formed on the resistive heater layer 41 by sputtering, and a similar treatment was effected for patterning to produce electrode layers 42 of stripe type as shown in FIG. 4. Further a part of ITO on the resistive heater layer was removed so as to obtain a heat generating portion (40 μm × 26 μm).

Then, an SiO$_2$ film of 2 μm thick was formed thereon by sputtering as an insulating layer 43, but both end portions of the resistive heater layer 41 were masked so as not to form an SiO$_2$ film thereon since it is necessary to connect with lead wires. The substrate 11 provided with a resistive heater layer 41 and a transparent protective plate 13 were placed face to face using a Mylar film as a spacer at a distance of 10 μm and adhered to each other.

Then, isopropyl acrylamide 5.0 g, and ammonium persulfate 30 m were dissolved in 100 ml of cold water, and 60 μl of tetramethylethylenediamine was added thereto followed by deaeration by an aspirator. Then the mixture was polymerized by standing for 30 min. at room temperature to obtain a polymer solution. This polymer solution was charged in the space between substrate 11 and transparent protective plate 12 and sealed. Thus an optical element was produced.

An electric pulse signal (pulse height of 20 V and pulse length of 5 msec) of frequency of 1 KHz was inputted to an optional combination of resistive heater layer 41 of the resulting optical element in correspondence to an information signal, and a predetermined position corresponding to the information signal exhibits opaque to respond thereto and it was confirmed that writing corresponding to the information signal was possible.

As is clear from the above examples, the optical element according to the present invention can give good results in each of the transparent type and the reflection type.

According to the present invention, the optical element is so excellent in scattering characteristics that highly clear images of high contrast and high resolution can be obtained and the limitation as to the visual field angle can be eliminated. Therefore, even when the optical element is used for a display apparatus for a long time, fatigue of eye is not caused. Further, the polymer liquid layer is modulated by only slight heating so that the power consumption of the display apparatus can be saved. In addition, high frequency modulation is possible.

EXAMPLE 7

As each of a substrate 11 and a transparent protective plate 13, there was used a sufficiently cleaned glass plate of 0.3 mm thick, 50 mm×10 mm in size, and the substrate 11 and the transparent protective plate 13 were disposed facing to each other with a Mylar film as a spacer at a distance of 10 μm and adhered to each other.

Isopropyl acrylamide 5 g, and ammonium persulfate 30 mg were dissolved in a cold water 100 ml, and there were added to the resulting mixture tetramethylethylenediamine 60 μl and copper sulfate becoming a concentration of $7\times10^{-4}M$.

The resulting solution was deaerated by an aspirator and then polymerized by standing for 30 min. at room temperature to form a polymer solution. The solution was charged into a space between substrate 11 and transparent protective plate 13 and sealed. Thus there was produced an optical element 50 of a light transmission type of the present invention as illustrated in FIG. 5.

The above-mentioned optical element 50 was irradiated by scanning with a semiconductor laser beam 55 of output of 20 mW and wavelength of 830 nm from the back surface of optical element 50 in accordance with an information signal with focussing to an optical modulation liquid layer 12, and it was observed that the irradiated region 56 in optical modulation liquid layer 12 was immediately changed from transparency to light scattering property since a polymer was precipitated therein and the region became opaque.

It appears that the semiconductor laser beam 55 is absorbed at the irradiated region of optical modulation liquid layer 12 and changed to heat and the polymer solution is heated by the heat. The heating time by the semiconductor laser beam 55 was only an instant, and when the irradiation was interrupted, the polymer-precipitating layer was immediately resolved and returned to the original light transmission state. Thus, the thermal responsing property was very good.

When the irradiation experiment by the above-mentioned laser beam 55 was repeated, it was found that the reproducibility and signal responsing property is practically sufficient.

EXAMPLE 8

Methacrylamide 0.5 g, and ammonium persulfate 10 mg were dissolved in 30 ml of a cold water, and then tetramethylethylenediamine 30 μl was added followed by deaerating by an aspirator. After standing for 30 min. at room temperature, to the mixture was added methanol 25 ml. Then the mixture was heated to 60° C. to form a polymer solution. The resulting solution was used as a polymer solution in a manner similar to the procedures in Example 7 above to produce an optical element.

The resulting optical element was subjected to imaging and light modulation as in Example 7 and there was obtained a good result similar to that in Example 7.

EXAMPLE 9

A substrate 11 constituted of an aluminum vapor-deposited layer of 1,000 Å thick and a polyethylene protective layer produced by plasma polymerization of 1,000 Å thick overlying the aluminum vapor-deposited layer was used, and as a transparent protective plate 3, a sufficiently cleaned glass plate of 0.3 mm thick and 50 mm×10 mm in size was used.

The substrate 11 and the transparent protective plate 12 were adhered to each other face to face at a distance of 10 μm using a Mylar film as a spacer.

Then, polymethylvinylether 5 g was dissolved in 100 ml of a cold water, and there were added to and dissolved in the resulting mixture nickel sulfate becoming a concentration of $10^{-3}M$. The other procedures were the same as those in Example 7 to produce an optical element 50 of a reflection type according to the present invention as illustrated in FIG. 6.

With respect to the resulting optical element 50, reflection light was measured by the same method as in Example 7. The result was as good as that in Example 7.

EXAMPLES 10–15

Repeating the procedure of Example 9 except that each of IRG - 003 and IR absorbers of the above-mentioned formulas (1)–(5) was used in place of nickel sulfate in the same concentration, each of the optical elements of the present invention was produced. These optical elements exhibited excellent performance similar to that in Example 9.

As shown in each of the above examples, the optical element according to the present invention exhibits good performance in both transmission type and reflection type.

As described above, the optical element according to the present invention is excellent in light scattering characteristics corresponding to an information signal, and therefore, there can be formed clear images of high contrast and high resolution, and limitation to the visual field angle can be eliminated. Thus, in the case of using the optical element of the present invention as a display apparatus, the user does not suffer an eye fatigue even when the display apparatus is operated for a long time. In addition, since the polymer gel layer is easily modulated by a small amount of heat, there is a large economical advantage that the power consumption of the display apparatus is a very little.

EXAMPLE 16

As shown in FIG. 4, a 1000 Å-thick tantalum nitride film was formed by sputtering onto the surface of the Mylar film 11 (substrate) having a dimension of 50 mm×50 mm and a thickness of 100 μm. A photo resist was applied onto the film. A stripe pattern of 20 line/mm parallel to a side of the film was baked, and then unnecessary portion of the film was selectively removed by etching to give a desired pattern of resistance film 41. Further thereon, 2000 Å-thick indium-tin oxide (ITO) film was laminated by sputtering, and a patterning similar to that mentioned above was carried out to form an electroconductive path 42. The portion (40μ×2000μ in size) of the tantalum nitride which is not covered by ITO is used as the heat generating resistance layer (41). Thereon ethyl methacrylate plasma treatment was carried out to form a crosslinked high molecular film of 80 μm as the insulating layer 43.

Onto this film, a Mylar film was adhered which has a thickness of 100 μm, a size of 50 mm×30 mm having an opening of 40 mm×10 mm at the central portion in such a manner that the heat generating resistance layer portion is inserted into the opening.

0.5 g of N-isopropyl acrylamide and 3 mg of ammonium persulfate were dissolved in cold water, followed by addition of 8 μl of tetramethylethylenediamine, and the solution was deaerated under a reduced pressure. Polymerization was carried out by maintaining the mixture at 20° C. for 30 minutes on a water bath. The resulting solution was dropped onto the opening portion of the above-mentioned film, which was then covered with a Mylar film of 50 mm×30 mm in size and 100 μm in thickness, and the periphery portion of the film was sealed with a cold-setting epoxy resin. Thus an optical element of the present invention was prepared. An arbitrary combination of the heat generating resistance layer, in correspondence with information signals was applied with electric pulses of 800 Hz frequency and 30V peak height at a rate of 10 ms per one pulse. A change from transparency to opacity was occurred at the position corresponding to the information signal on the element. It was found that the optical correspondence can be obtained at a repeating cycle as short as 30 ms.

This element did not break at a bending of about 5 mm of curvature, and the corresponding characteristics deteriorate little even at a bending of more than 10 mm of curvature.

EXAMPLE 17

A Mylar film carrying a heat generating resistance layer was prepared in the same manner as in Example 16. Onto the film, a Mylar film of 100 μm thick and 50 mm×30 mm in size having an opening of 40 mm×10 mm at the central portion thereof was adhered in such a manner that the heat generating resistance portion be inserted into the opening.

0.4 g of diethyl acrylamide, 8 mg of N,N-methylene-bis-acrylamide and 3 mg of ammonium persulfate were dissolved in 10 ml of cold water, and 8 μl of tetramethylethylenediamine was added thereto. The solution was deaerated under a reduced pressure. This solution was dropped onto the above-mentioned opening portion of the adhered film, under nitrogen atmosphere and it is covered with a Mylar film of 50 mm×30 mm in size and 100 μm in thickness in such a manner that air is not incorporated, then the periphery portion was sealed with a cold setting epoxy resin. The polymerization was carried out by keeping the resulting article in a thermostatic chamber of 20° C. for one hour.

A similar response to that in Example 16 was obtained when electric signals are input to the element in the same manner as in Example 16.

EXAMPLE 18

A Mylar film having a heat generating resistance layer was prepared in the same manner as in Example 16. Onto this film, a Mylar film was adhered which has a thickness of 100 μm, a size of 50 mm×30 mm having an opening of 40 mm×10 mm at the central portion in such a manner that the heat generating resistance layer portion is inserted into the opening.

0.5 g of polypropylene oxide (average molecular weight: 400, supplied by Kishida Kagaku K.K.) was added to 5 ml of water to give a polymer solution. This solution was dropped onto the abovementioned opening portion of the Mylar film which was then covered with a Mylar film of 50 mm×30 mm in size and 100 μm in thickness in such a manner that air be not incorporated, then the periphery portion was sealed with a cold setting epoxy resin. Thus an optical element of the present invention was prepared.

A similar response to that in Example 16 was obtained when electric signals are input to the element in the same manner as in Example 16.

EXAMPLE 19

A Cd.Tb.Fe layer was formed to a thickness of 1500 Å on a surface of a Mylar film of 50 mm×50 mm in size and 100 μm in thickness by sputtering to prepare an infrared-ray-absorbing layer.

Onto this film, a Mylar film is adhered which has a thickness of 100 μm, a size of 50 mm×30 mm having an opening of 40 mm×10 mm at the central portion in such a manner that the heat generating resistance layer portion is inserted into the opening.

0.5 g of N-isopropyl acrylamide and 3 mg of ammonium persulfate were dissolved in cold water, followed by addition of 8 μl tetramethylethylenediamine, and the solution was deaerated under a reduced pressure. Polymerization was carried out by maintaining the mixture at 20° C. for 30 minutes on a water bath. The resulting solution was dropped onto the opening portion of the above-mentioned film, which was then covered with a Mylar film of 50 mm×30 mm in size and 100 μm in thickness, and the periphery portion of the film was sealed with a cold-setting epoxy resin. Thus an optical element of the present invention was prepared.

Opaque spots were formed corresponding the information signals on irradiation of a semiconductor beam (wave length: 833 nm, spot diameter: 50 μm, output power: 20 mW) according to information signals from the side of transparent protection plate of the element. An image was formed on the element by scanning the beam.

This element did not break at a bending of about 5 mm of curvature, and the corresponding characteristics deteriorate little even at a state of bending of more than 10 mm of curvature.

The following effects are obtained according to the present invention:

(1) The element will not easily be destroyed by an impact since the element is flexible as a whole. Further, the operation even in a distorted state is possible.

(2) Mechanical designing is made easy for incorporation into devices in combination with the characteristics mentioned in (1), since it can be made into thin form.

(3) A definite output can be obtained, since the change of optical characteristics of the element is large in response to the input signals.

(4) The element becomes a display device of which angle of visibility has no restriction, and hence easy observation can be obtained.

(5) A polymer liquid layer is easily formed, and hence steps for preparation of the element become simple.

According to one of embodiments of the present invention, there is provided a light modulation apparatus comprising a signal input portion, a light receiving medium, light modulation element disposed therebetween, said light modulation element being capable of applying a light to a light receiving medium and intercepting a light in accordance with an input signal, characterized in that the light modulation element comprises a heat generating resistive member generating heat in accordance with an input signal and a light modulation member causing light scattering when it receives a heat generating at the heat generating resistive member, and the light modulation member being composed of an organic polymer solution.

Figure 9:
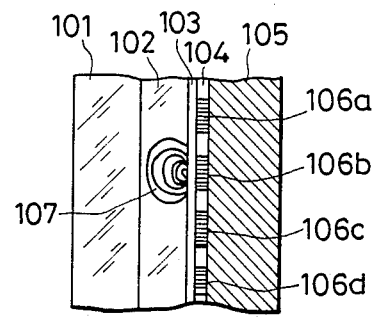
FIGS. 9 and 10 illustrate examples of optical modulation elements.

FIG. 9 shows an embodiment of a light modulation element for the light modulation apparatus according to the present invention. In FIG. 9, 101 is a transparent protective plate, 102 is an organic polymer solution thin layer, 103 is an insulating layer having thermal conductivity, 104 is a heat generating resistive member layer in which heat generating resistive members 106a, 106b, 106c, 106d . . . are arranged, 105 is a support for an insulating layer 103 and heat generating resistive members (106a, 106b . . . ). When the heat generating resistive members generate heat, the heat is transferred to the insulating layer 103 and then to the organic polymer solution thin layer 102 to form a white turbid portion 107 in the organic polymer solution thin layer 102 resulting in exhibiting a light scattering property.

For example, as shown in FIG. 9, when heat generating resistive member 106b is selected to generate heat, the heat is transferred to organic polymer solution thin layer 102 through insulating layer 103 adjacent to heat generating resistive member 106b, and then heats the organic polymer solution at the region of the organic polymer solution thin layer 102 facing the heat generating resistive member 106b, and a white turbid portion 107 is formed at that region.

As a predetermined period of time lapses, the white turbid portion 107 disappears as the organic polymer solution at this region is cooled. This one cycle of formation and disappearing of the white turbid portion 107 is a very short time and it can be effected on the order of KHz.

The above-mentioned heat generating resistive member (106a, 106b . . . ) can be formed on support 105 by I.C. fabricating technique, and the distance between the adjacent heat generating resistive members (106a, 106b . . . ) can be made on the order of $\mu$m.

In this way, as a light modulation member deforming the wave surface of an incident light, an organic polymer solution is used and therefore, it is not necessary to pay a special attention to a polarized light, different from the case of crystal in conventional technique.

In the prior art, it is necessary that the light flux is propagated in the direction parallel to the electrode surface or heater surface, but in the present invention this is not necessary, that is, the light flux may be incident on the heater surface at a right angle or other angle and therefore, there is not such a limitation as above with respect to arrangement upon assembling light modulation elements to fabricate a light modulation apparatus.

Figure 10:
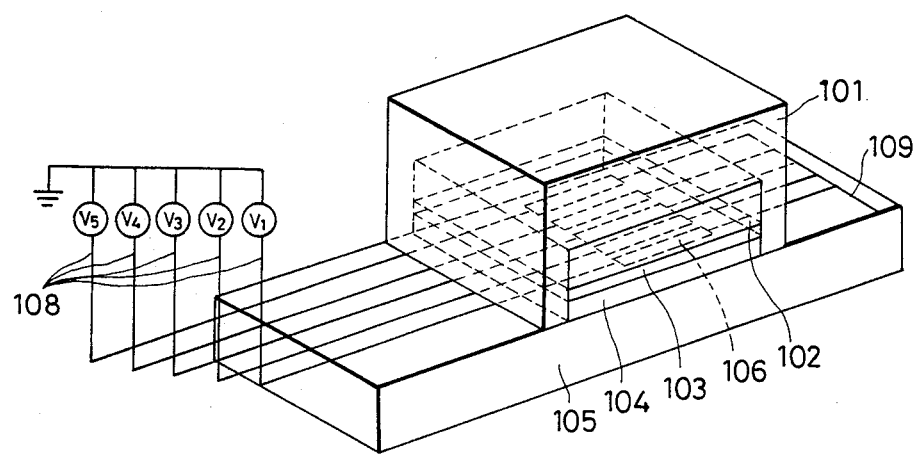

FIG. 10 is an oblique view showing the constitution of the light modulation element in FIG. 9 and the reference numerals 101-106 are the same as those in FIG. 9. 108 is leading wires constituting a signal input portion and is connected to each distinct driving voltages so as to drive independently each of heat generating resistive members (106a, 106b, . . . ). The other end of the heat generating resistive member (106a, 106b . . . ) is grounded or set to a common voltage. Voltage signals are applied to respective heat generating resistive members (106a, 106b, . . . ) from lead wires 108, and then white turbid portion 107 is formed in organic polymer solution thin layer 102 adjacent to each heat generating resistive member (106a, 106b, . . . ). The white turbid portion 107 is cooled and returns to the original non-white turbid state when the voltage signal is made zero.

Figure 11A:
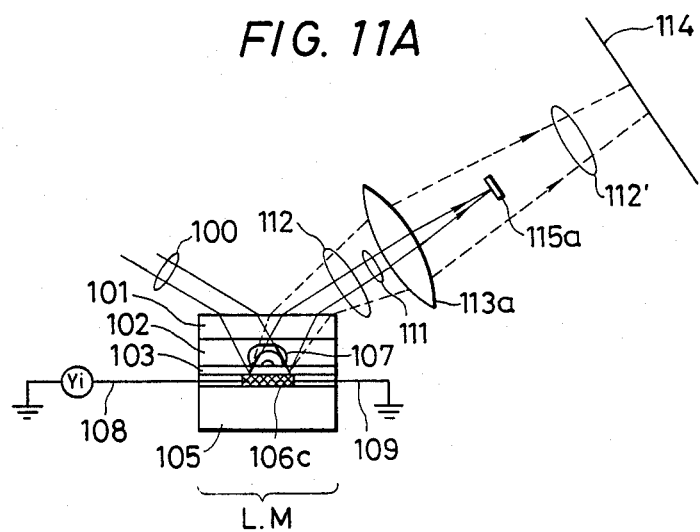
FIGS. 11A and 11B each shows an example of a light modulation device of the present invention.

FIG. 11(A) shows an embodiment of light modulation apparatus using a light modulation element L.M. by the above-mentioned light scattering and an example where the light flux whose wave surface is deformed by light scattering is used as an information light.

When a light flux 100 is incident on the light modulation element L.M. and an optionally selected heat generating resistive member 106c among the heat generating resistive members (106a, 106b, . . . ) is driven by voltage Vi, a white turbid portion 107 is formed and the light flux incident on the heat generating resistive member 106c goes out as a light flux 112 whose wave surface is deformed.

A light flux 111 which has been normally reflected on the surface of the heat generating resistive member and whose wave surface has not been deformed by the white turbid portion 107 forms image by a lens 113a and is subjected to shading by a shading filter 115a disposed at the image formation position.

The light flux 112 whose wave surface has been deformed is partly shaded by the shading filter 115a. However, by making the size of shading filter 115a the minimum size which shades the image formation spot of the light flux 111 whose wave surface has not been deformed, it is possible to project most of the wave surface deformed light flux 112 onto a light receiving medium 114.

According to the present invention, since a material capable of making the degree of light scattering drastic can be freely selected as a thermal effect light modulation member and the divergent angle of a light flux caused by the white turbidity is larger than the diffraction angle when the above-mentioned electrooptical crystal is used, even when the same size of a shading filter 115a is used, the rate of the divergent light shaded is very small in the present invention.

As mentioned above, when a voltage pulse corresponding to an input signal is added to a heat generating resistive member 106c through a lead wire 108 or is made zero, the formation and elimination of the white turbid portion 107 are repeated.

At that case, a light spot comes on or off on the light receiving medium 114. By making a point on the heat generating resistive member and a point on the light receiving medium 114 conjugate by the lens 113a, an image at the portion where a light scattering is generated contiguous to the heat generating resistive member can be formed on a light receiving medium 114 as a spot.

Figure 11B:
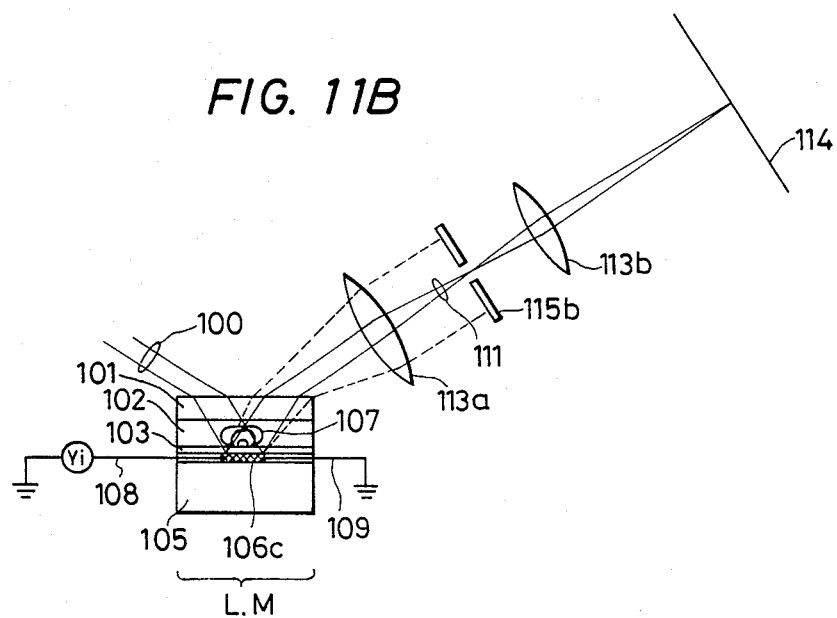

FIG. 11(B) also shows an embodiment of a light modulation apparatus using the above-mentioned light modulation element L.M. and an example where a light flux 111 not scattered at the white turbid portion 107 is used as an information light.

In FIG. 11(B), a light shading plate 115b is provided at a position to which a light flux 111 not modulated by the light modulation element L.M. is condensed by a lens 113a. This light shading plate is provided at the center portion with an aperture so as to allow the light flux 111 to pass and shade the light flux 112 shown by the broken line and diverged by the light modulation element L.M.

Thus, most of the divergent light by light scattering is shaded by shading filter 115b, and only the light flux 111 not subjected to deformation of wave surface mainly passes the shading filter 115*b*. By providing a lens 113*b* making conjugate the relation between the image formation spot by a lens 113*a* or the shading filter 115*b* and the light receiving medium 114, a light spot comes on or off at the light receiving medium 114.

FIG. 12 shows a state of light flux incident on a light modulation element L.M. which improves the contrast of coming on and off of light at the light receiving medium 114, that is, optimizing the light utilization efficiency.

Figure 12A:
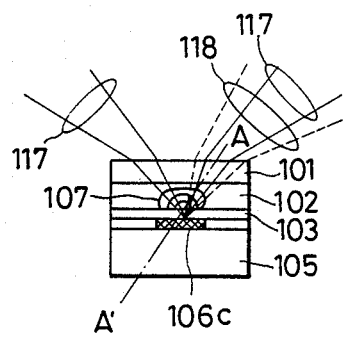
FIGS. 12A and 12B illustrate preferable examples of a light modulation devices of the present invention.
Figure 12B:
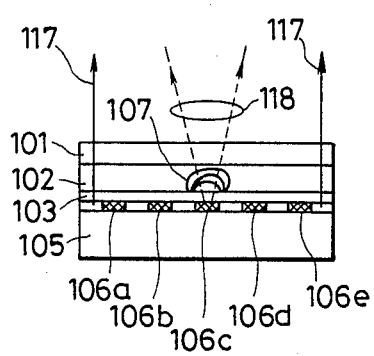

FIG. 12(A) is a view of a light modulation element L.M. in the direction of arrangement of the heat generating resistive member, and FIG. 12(B) is a view of the light modulation element L.M. in the direction perpendicular to the direction of arrangement of the heat generating resistive member.

The nearer to the heat generating resistive member, the larger the degree of light scattering. When a light flux 116 is concentratedly incident thereon, the efficiency of divergence becomes the highest.

Depending on the roughness or degree of planeness of the surface of support 105, heat generating resistive members (106*a*, 106*b*, ... ), or insulating layer 103, the shading efficiency of shading filter 115*b* becomes lower as to the light flux other than that of divergent light produced by light scattering, and therefore a noise light is projected on light receiving medium 114.

This noise light is projected on light receiving medium 114 regardless of input signal voltage pulse series Vi applied by lead wire 108, and therefore, the contrast is lowered. In order to eliminate such drawbacks, it is desired to converge, as shown in FIG. 12(A), in a form of line, the input light flux 116 at a region contiguous to the heat generating resistive members.

117 is a normal reflection light flux (not diverged by light scattering) of incident light flux 116 and a broken line 118 shows a divergent light flux caused by light scattering.

FIG. 12(B) is a cross-sectional view taken along A—A' in FIG. 12(A). 117 is a normal reflection light flux of an incident light flux 116. 118 is a divergent light flux caused by a white turbid portion 107 generated at a portion contiguous to a portion of heat generating resistive member 106*c* to which an image signal is inputted, and 118 is scattered to a direction different from the normal reflection light flux 117.

Figure 13:
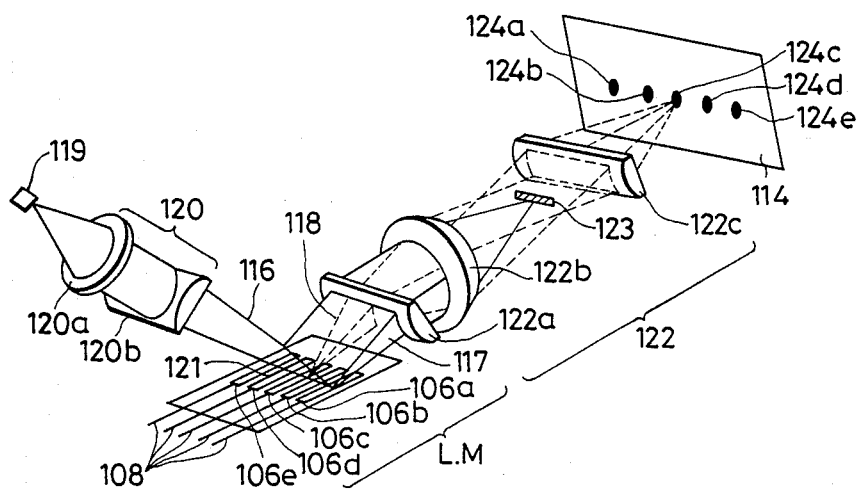
FIGS. 13 and 14 illustrate other examples of optical modulation elements employed in the present invention.

FIG. 13 shows an arrangement of an example of a light modulation apparatus of the present invention which exhibits an enhanced light utilization efficiency and a good contrast of coming on and off of light at the light receiving medium 114 as explained in FIG. 12.

In this example, a light flux emitted from a light source 119 such as a semiconductor laser or a light emitting diode forms an image in a form of line in the direction of arrangement of heat generating resistive members (106*a*, 106*b*, ... ) of the light modulation element L.M. by a line image forming optical system 120 constituted of a spherical lens 120*a* and an anamorphic lens 120*b*.

The component of the light flux formed in a form of line in a plane perpendicular to the direction of arrangement of heat generating resistive members converges on the heat generating resistive member, but the component of the light flux in a plane defined by the direction of arrangement and the optical axis to the line image forming optical system 120 is in a state of parallel light flux.

Therefore, a light flux 117 not diverged at the heat generating resistive member forms a light path in a form of trigonal prism and is incident on a positive cylindrical lens 122*a*. The cylindrical lens 122*a* is provided such that it has a generatrix in the direction of arrangement of heat generating resistive members and the focus line surface consists with the position of heat generating resistive members.

Consequently, light flux 117 passes through cylindrical lens 122*a* and then becomes afocal light flux and is incident on spherical lens 122*b*. By spherical lens 122*b*, the light flux 117 is condensed on the focal surface of the lens. On the focal surface is provided a rectangular filter 123 sufficient to shade the light flux 117, and therefore, a light flux which is not diverged by the heat generating resistive member is shaded by the filter 123.

On the other hand, among the light flux 118 diverged by the heat generating resistive member, only the light flux in the plane perpendicular to the direction of arrangement of the heat generating resistive members becomes a parallel light by a cylindrical lens 122*a*, and further the light forms an image at a portion contiguous to the rectangular filter 123 by the spherical lens 122*b*.

Therefore, a part of divergent light flux 118 is shaded by rectangular filter 123, but most of the light flux is not intercepted by shading filter 115, but is incident on a positive cylindrical lens 122*c* having a generatrix in the same direction as that of the cylindrical lens 122*a* and point images (124*a*, 124*b*, ... ) are formed on a light receiving medium 114.

Filter 123 and light receiving medium 114 are located at a focal line surface optically conjugate with respect to cylindrical lens 122*c*, and the heat generating resistive heater and light receiving medium 114 are optically conjugate with respect to the spherical lens system 122*b*.

By another expression, with respect to an anamorphic lens system 122 constituted of cylindrical lenses 122*a* and 122*c* and spherical lens system 122*b*, the heat generating resistive members (106*a*, 106*b*, ... ) and light receiving medium 114 are located in an optically conjugate focal line surface in a plane perpendicular to the direction of arrangement of heat generating resistive members. And in the plane defined by the optical axis of anamorphic lens system 122 and the direction of arrangement of heat generating resistive members, the light receiving medium 114 is present on the focal line surface of the anamorphic lens system 122. In FIG. 13, there is shown only the heat generating resistive members as to the light modulation element L.M.

Figure 14:
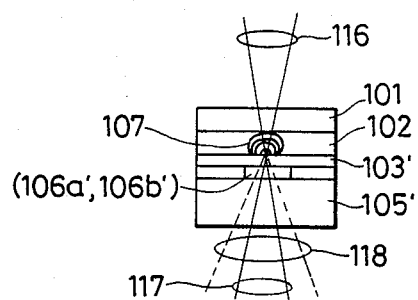

In the above-mentioned example, the heat generating resistive members are constituted of a reflecting member and both the divergent light flux and light flux not diverged are reflected by the heat generating resistive members, and in FIG. 14 all light fluxes pass through the light modulation element.

The construction of the light modulation element itself shown in FIG. 14 is the same as that in FIG. 9, but a support 105' heat generating resistive members (106*a*', 106*b*', ... ) and an insulating layer 103' are constituted of transparent media. Also in this case, a sufficient practical effect can be obtained by using the above-mentioned optical system.

Figure 15A:
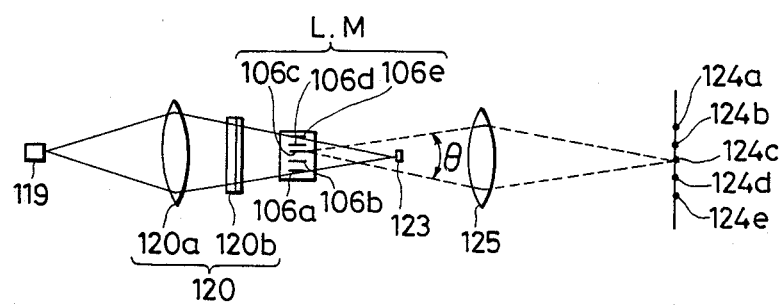
FIGS. 15A and 15B illustrate examples of optical modulation devices of the present invention.

FIG. 15(A) and (B) show an example of a light modulation apparatus, and a line-like image is formed in the direction of arrangement of heat generating resistive members (106*a*, 106*b*, ... ) in a light modulation element L.M. in a manner similar to the optical system in FIG. 13.

Figure 15B:
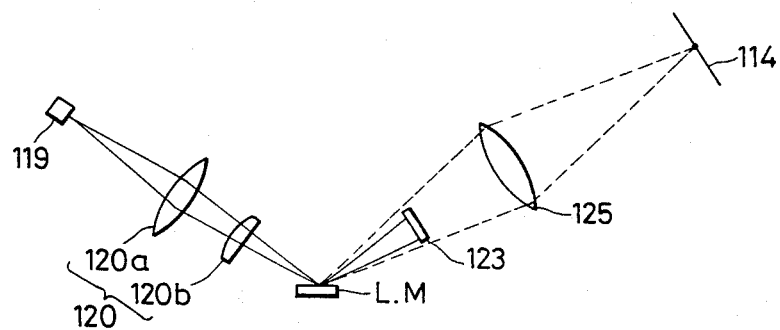

FIG. 15(A) is a view from the direction perpendicular to the line image. FIG. 15(B) is a side view of FIG. 15(A). The difference from the optical system in FIG. 13 reside in that the light flux emitted from the light source is condensed by a lens 120a, and, as shown in FIG. 15(A), a conjugate image of the light source is formed between the light modulation element L.M and a lens 125, and further as shown in FIG. 15(B), a line-like image is formed near to heat generating resistive members of the light modulation element L.M by a line forming optical system 120 composed of a lens 120a and an anamorphic lens 120b.

In FIG. 15(A), a shading filter 123 in a form of rectangle having a long side in the direction perpendicular to the direction of arrangement of heat generating resistive members (106a, 106b, . . . ) is placed at a conjugate image position as to the light source, and therefore, a light flux not diverged by light scattering is shaded while a light flux diverged by light scattering passes the outside of shading filter 123 and is incident on a lens 125 with respect to which heat generating resistive members (106a, 106b, . . . ) and a light receiving medium 114 are at a conjugate relation, and image formation spots 124a, 124b, . . . are formed on the light receiving medium 114. By arranging the system as mentioned above, as optical system as shown in FIG. 13 can be simplified.

FIG. 16 shows an example of a light modulation apparatus for producing color images according to the present invention. Light source 119a is a red LED (light emitting diode), 119b a green LED, and 119c a blue LED, and 126 is a dichroic mirror which transmits light of a red wavelength zone and which reflects light of a green wavelength zone and 127 is a dichroic mirror allowing to pass lights other than a light of a blue wavelength zone and reflecting a blue wavelength zone, and a light flux from each light source reaches heat generating resistive members of the light modulation element L.M. Other structures are the same as those of the optical system as shown in FIG. 15.

It is possible to form color images on light receiving medium 114 by using such light sources of three colors and a light modulation element.

FIG. 17 shows a system of the color image generating device as shown in FIG. 16, and FIG. 17(A) shows a series of voltage pulses inputted to heat generating resistive members (106a, 106b . . . ) of the light modulation element L.M. V1i, V2i, . . . V6i (i=1-3) are voltage pulses applied to the above-mentioned heat generating resistive members (106a, 106b . . . 106e), respectively, and i(=1-3) indicates the number of the cycle. FIG. 17(B) shows an electric current signal pulse inputted to the LED 119a, and LED 119a emits light during the period that the above-mentioned voltage pulse series V11, V21 . . . V51 are generated. FIG. 17(C) shows as electric current signal pulse inputted to LED 119b, and the LED emits light during the period that the above-mentioned voltage pulse series V12, V22 . . . V52 are generated. FIG. 17(D) shows that LED 119c emits light while the voltage pulse series V13, V23 . . . V53 are generated.

In FIGS. 17(A), (B), (C), and (D), the abscissa is a time, and the above-mentioned signal pulse is generated periodically in the previous time zone (not shown). As shown in FIG. 16, when the light receiving medium 114 moves to the direction as shown by an arrow, there are formed, on the surface of the light receiving member, red, green and blue spots aligned in the direction of the arrow, that is, in the direction of movement of the light receiving medium. By forming one picture element using the three spots, there can be effected color display.

In FIG. 17(A), voltage pulses are inputted to all heat generating resistive members at the same interval, but if voltage pulses are generated corresponding to image signals, optional color images can be formed on the light receiving medium 114. As mentioned above, according to the present invention, it is not necessary to have particularly a polarized light characteristic, and light sources having different wavelengths can be used.

Figure 18:
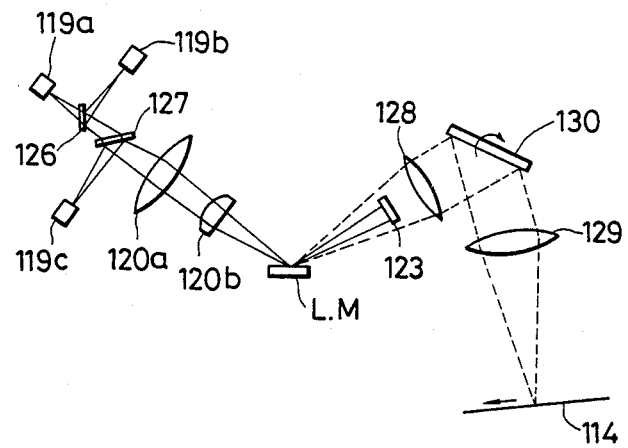
FIGS. 18 and 19 illustrate another examples of a modulation apparatus for color image forming light.

FIG. 18 is an application example of an apparatus shown in FIG. 16, and a color image shown in FIG. 16 is formed by using a deflecting device 130 and scanning the whole surface of a light receiving medium 114 with a scanning spot.

If a photosensitive recording material such as silver salt film is selected as the light receiving medium, a digital color printer can be realized. Or, if a light diffusion screen is used as a light receiving medium, color display can be conducted.

According to the present invention, the light extinguishing ratio of the signal light (divergent light caused by light scattering) is high, and in addition, since the divergent efficiency is high, luminance of the image formation spot light on the light receiving medium can be made high, and the above-mentioned digital color printer or color display can be realized. Needless to say, in digital color printers and displays, the light source may be one, that is, monochromic printers or monochromic display.

In the examples shown in FIG. 13–FIG. 18, as the signal light, a divergent light produced by light scattering, but, needless to say, as the signal light, a non-divergent light may be used as well, as shown in FIG. 11(B). Therefore, it is omitted to explain FIG. 13–FIG. 18 where such non-divergent light is used.

Figure 19:
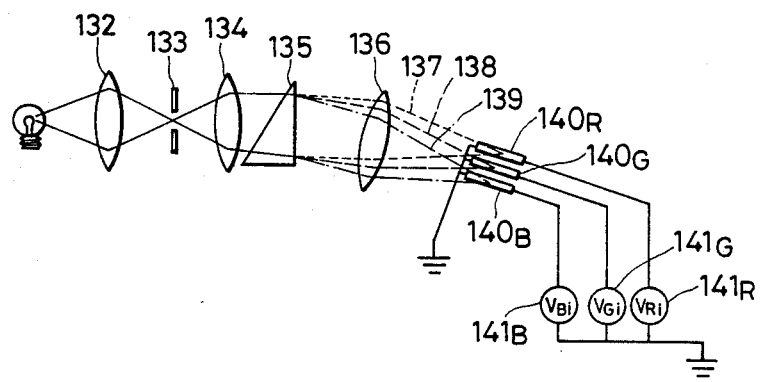

FIG. 19 shows a further example of a light modulation apparatus for producing color images according to the present invention.

In FIG. 19, a light source 131 is an ordinary white light lamp such as halogen lamp, lens 132 is a condensing lens, 133 is a pinhole plate for limiting the secondary light source image, 134 a collimator lens, 135 a prism causing the color dispersion, 136 a convergent lens, and 140R, 140G and 140B are heat generating resistive members for generating red, green and blue scattered lights as color signals, and are connected to voltage impressing means 141R, 141G and 141B generating voltage pulses independently corresponding to the input signals, respectively. Here, for simplifying the explanation, details of the light modulation element are not shown, but are the same as those in FIG. 10 except for the above-mentioned heat generating resistive member portion.

In the above-mentioned example, focused light images of a red light flux, a green light flux and a blue light flux are formed on heat generating resistive members 140R, 140G and 140B, respectively, by a color dispersion prism 135 and a lens 136, and each color signal light can be modulated corresponding to image signal.

Further, in FIG. 19, a cylindrical lens having a generatrix perpendicular to the paper is used in place of the lens 136 so that a red light flux, a green light flux and a blue light flux form images in a form of line. The line-like fluxes corresponding to these colors are formed in parallel at a small distance. Therefore, the above-mentioned heat generating resistive members 140R, 140G and 140B are made one unit, and a plurality of the units are arranged along the direction of the line-like image to form a plurality of color picture element series. When a diffraction grating is used in place of a prism as a light flux dispersion means in FIG. 19, the same effect can be obtained.

In FIG. 20, a further example of a light modulation apparatus according to the present invention is illustrated. This shows that there is not any limitation to the direction of a light flux incident on the light modulation element according to the present invention.

Figure 20A:
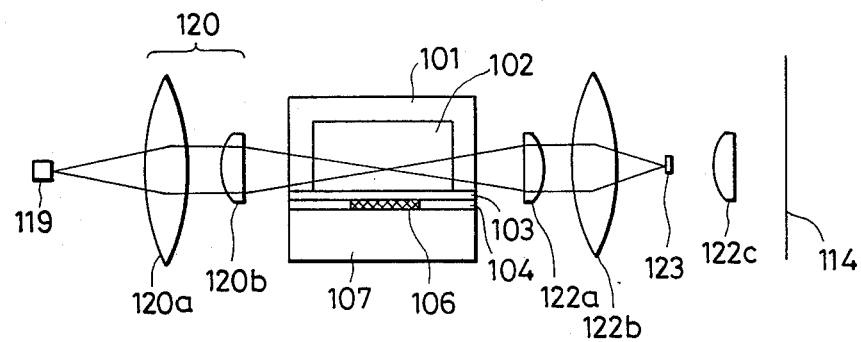
FIGS. 20A and 20B illustrate other examples of a light modulation apparatus.
Figure 20B:
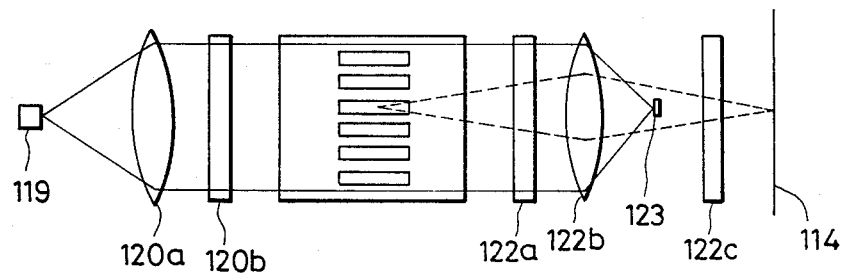

FIG. 20(A) is a figure viewed in the direction of arrangement of heat generation resistive members. FIG. 20(B) is a top view of FIG. 20(A).

The constituting members are the same as those of the light modulation apparatus in FIG. 13, but in the case of the optical system of FIG. 13, the center ray of light of a light flux emitted from a light flux generating means constituted of a light source 119 and a line image forming optical system 120 incident on the light modulation element is incident on the heat generating resistive member layer 104 at an angle while in the optical system of FIG. 20, the light flux incident on the light modulation element is incident parallel to the heat generating resistive member layer 104. In the light flux passing through the light modulation element, as shown in FIG. 13 the non-divergent light flux is shaded while the divergent light flux reaches the surface of the light receiving medium.

Figure 21A:
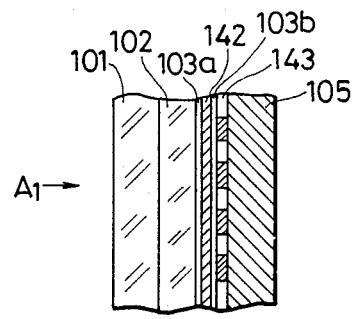
FIGS. 21A and 21B each illustrates an example of a light modulation element of the present invention.
Figure 21B:
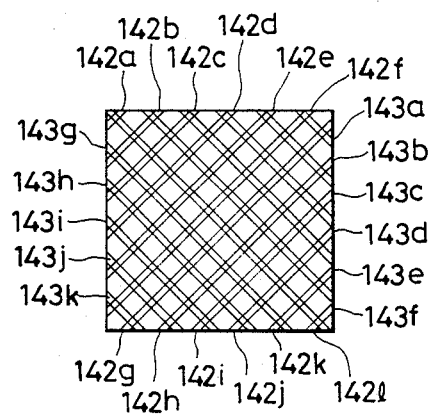

FIG. 21 shows a light modulation element capable of generating light scattering in row and column. FIG. 21(A) is a side view of a light modulation element and FIG. 21(B) is a front view of the light modulation element, that is, the state of arrangement of heat generating resistive layer when FIG. 21(A) is viewed in the direction of arrow A.

In FIG. 21(A), a transparent protective plate 101, an organic polymer solution thin layer 102 and a support 105 are the same as those of the light modulation element in FIG. 9. 103a and 103b are thermally conductive insulating layers. Each of 142 and 143 is heat generating resistive member layers composed of a plurality of line-like heat generating resistive members arranges parallel to each other at the same distance, and as shown in FIG. 21(B), resistive members (142a-142l) of the heat generating resistive member layer 142 and resistive member (143a-143k) of the heat generating resistive member layer 143 are arranged such that they cross each other at an angle α.

The light modulation element of FIG. 21 is designed such that when a voltage is impressed to both resistive members crossing each other, the crossing region becomes white turbid.

For example, when a voltage is impressed to 142d, 143c and 143e, the crossing regions P1 and P2 (black regions) become white turbid. Therefore, in order to obtain a pattern of two dimension formed by light scattering, for example, firstly a voltage is impressed to only 142a among the heat-generating resistive members 142a-142l and a voltage is impressed to a desired heat generating resistive member selected from heat generating resistive member crossing 142a. Then, a voltage is impressed to only 142b, and a voltage is impressed to a desired heat generating resistive member selected from heat generating resistive members crossing 142b. By repeating the above-mentioned procedures with respect to all of 142a-142l, a two-dimensional pattern can be obtained.

Figure 22:
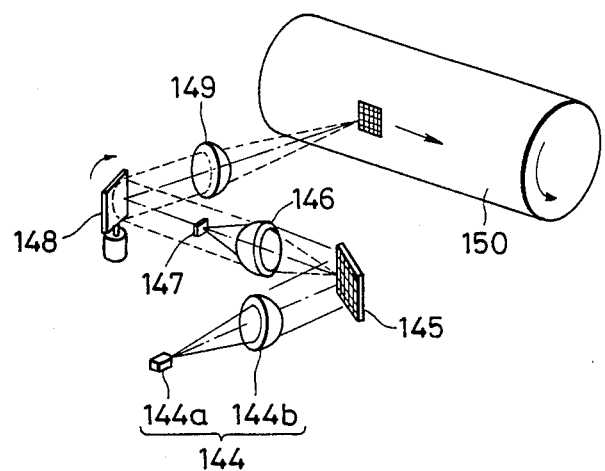
FIG. 22 illustrates an example of a light modulation apparatus formed by employing the light modulation element shown in FIGS. 21A and 21B.

FIG. 22 shows an example of a light modulation apparatus according to the present invention using a light modulation element as shown in FIG. 21.

A light modulation element 145 capable of producing a two-dimensional pattern of white turbid portions is irradiated with a light flux emitted from a light flux generating means 144 constituted of a light source 144a and a collimator lens 144b. A light flux not diverged by light scattering is condensed by lens 146 and shaded by a shading filter 147 located at the focal plane of lens 146. Since the light flux scattering position of the light modulation element 145 is almost consistent with the other focal plane of lens 166, the light flux diverged by a light modulation element 145 becomes almost parallel light flux by lens 146 and an image is formed on a photosensitive medium surface 150 by a lens 149, and as a result, a two-dimensional image corresponding to the pattern generated at white turbid portions.

When a deflecting mirror 148 is placed between lens 146 and lens 149 to enable the divergent light flux to deflect, scanned images of the above-mentioned two-dimensional images can be obtained on the photosensitive member surface 150. For example, if the design is made such that a light modulation element capable of generating white turbid portions two-dimensionally produce various letter patterns by light scattering, the resulting system can be used for printer terminal apparatuses such as word processor. The rotation of the above-mentioned deflection mirror is preferably intermittent rotation since the white turbid portions are not always formed simultaneously on the whole surface by the light modulation element 145.

Needless to say, the light modulation element capable of forming two-dimensional patterns can be a light modulation element of a light transmission type as shown in FIG. 13.

In the above, an example of forming white turbid portions by using heat generating resistive members is described, but the white turbid portions can be also produced by scanning a light beam and converting the scan beam to heat.

Figure 23:
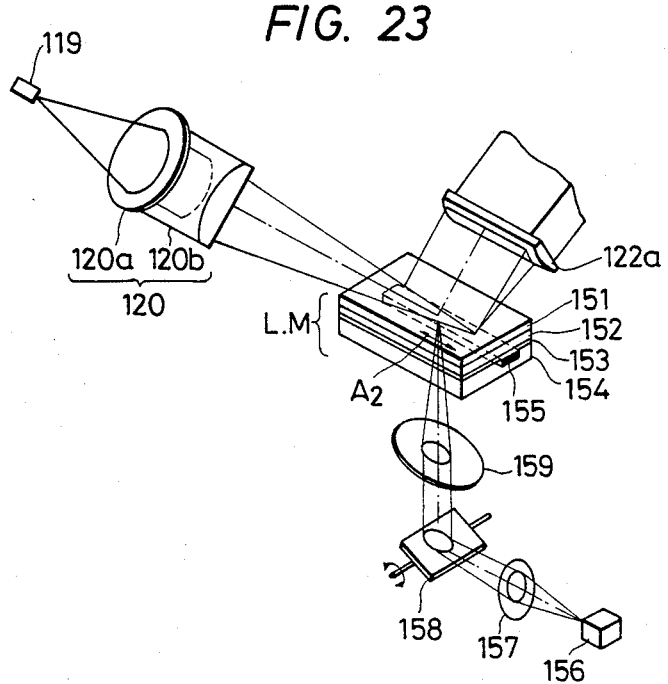
FIG. 23 illustrates another example of an optical modulation element of the present invention.

FIG. 23 shows an example where white turbid portions are formed by scanning a light beam, and the system is constituted of light modulation element L.M, transparent protective plate 151, organic polymer solution thin layer 152, thermally conductive insulating layer 153, and transparent support 154. Support 154 is provided with a heat absorbing layer 155. 156 is a semiconductor laser capable of self modulation, and a light flux from the semiconductor laser 156 becomes a parallel beam by a collimator lens 157 and forms an image on the above-mentioned heat absorbing layer 155 by a condenser lens 159 for scanning by way of galvanomirror 158.

The heat absorbing layer 155 is constituted of a material which absorbs particularly well a light flux of a wavelength from semiconductor laser 156, and therefore, the light flux passing the heat absorbing layer 155 becomes substantially zero.

A scanning optical system is set such that when the galvanomirror 158 is rotated around the rotation axis, the light beam spot moves along the heat absorbing layer 155 in the direction of arrow $A_2$.

At the region of heat absorbing layer 155 where beam spots by the semiconductor laser 156 are formed, the light beam is converted to heat and white turbid portions are formed in the organic polymer gel thin layer by way of insulating layer 153. Therefore, a white turbid portion can be formed at a desired position by "on or off" of a beam emitted from the semiconductor laser according to the rotation of galvanomirror 158.

As an optical system capable of projecting a light flux diverged by the white turbid portion and leading the divergent light to the light receiving medium, needless to say, the optical system in FIG. 13 and all of the above-mentioned optical systems of reflection type can be used, and therefore, the explanation is omitted here.

By providing the heat absorbing layer 155 on the whole surface and making the scanning optical system projecting a light beam to the heat absorbing layer of a two-dimensional scanning optical system type, there is obtained a light modulating element of light scattering having a two-dimensional pattern as shown in FIG. 23.

As mentioned above, the light modulation apparatus according to the present invention has the following advantages as compared with conventional light modulation apparatuses.

(1) By selecting an organic polymer solution having thermal effect, there can be obtained a relatively large divergent angle of a light flux diverged by light scattering at the white turbid portion, and therefore, divergent light and non-divergent light can be efficiently separated from each other, and the utilization efficiency of light flux and S/N ratio are high.

(2) Upon diverging by light scattering, constant scattering characteristics can be obtained without depending upon the incident angle of light flux incident on an organic polymer solution having white turbid portions. Therefore, the arrangement of the optical system is not subjected to any limitation.

(3) When an electrochemical crystal is used, one light modulation can be effected by using two electrodes. On the contrary, in the case of using diverging by light scattering according to the present invention, one light modulation can be made by one electrode and therefore, a modulation of high density per unit area is possible and a high quality can be attained upon display or recording.

(4) In the case of diverging a light flux by light scattering, it is not necessary to polarize the incident light flux, and even when ordinary light sources other than laser are used, the same effect can be obtained Therefore, the apparatus can be manufactured at low cost.

(5) The heat generating resistive member for generating a white turbid portion can be easily fabricated by a process for producing I.C. patterns, and it is easily possible to arrange at a high density such as 100 lines or more per 1 mm, and as a result, images of high quality can be obtained. In addition, by using a process for producing I.C. patterns, 1,000–10,000 pieces of heat generating resistive members can be arranged on the order or micron. It is easy to arrange heat generating resistive members which provide the number of dots sufficient for scanning one line. Thus, scanning of one line can be effected simultaneously so that the speed of image recording and image display can be enhanced.

What we claim is:

1. An optical element comprising: a pair of plates between which an optical modulation liquid layer is sandwiched, the optical modulation liquid layer exhibiting a light scattering property caused by suspension of fine particle polymer when heated and exhibiting transparency caused by dissolution of fine particle polymer when not heated, the change of such light scattering property to transparency being reversible, wherein the optical modulation liquid layer contains a light-absorbing heat-generating agent.

2. An optical element according to claim 1, in which the optical modulation liquid layer contains a solvent and a polymer made of a hydrophilic monomer.

3. An optical element according to claim 2, in which the hydrophilic monomer is acrylamide or methacrylamide.

4. An optical element according to claim 2, in which the hydrophilic monomer is at least one selected from a group consisting of N-isopropylacrylamide, methyl vinyl ether, ethylene oxide and propylene oxide.

5. An optical element according to claim 2, in which the solvent is at least one selected from a group consisting of water, alcohols, ketones, hydrocarbons, halogenated hydrocarbons, ethers, amides and sulfoxides.

6. An optical element according to claim 1, in which the pair of plates are faced to each other at a distance of 1 $\mu$m to 1000 $\mu$m.

7. An optical element according to claim 1, in which the light-absorbing heat-generating agent is an infrared-ray-absorbing agent.

8. An optical element according to claim 7, in which the infrared-ray-absorbing agent is at least one kind of compounds selected from a group consisting of cyanines, xanthene derivatives, thiapyrylium salt derivatives and pyrylium salt derivatives.

9. An optical element according to claim 7, in which the infrared-ray-absorbing agent is contained at a concentration of $10^{-5}$ to $10^{-2}$ in the optical modulation liquid.

* * * * *

UNITED STATES PATENT AND TRADEMARK OFFICE
CERTIFICATE OF CORRECTION

PATENT NO. : 4,832,466

DATED : May 23, 1989

INVENTOR(S) : YUKUO NISHIMURA, ET AL.      Page 1 of 5

It is certified that error appears in the above-identified patent and that said Letters Patent is hereby corrected as shown below:

COLUMN 1

Line 20, "a" should be deleted.
    Line 62, "a" should be deleted.

COLUMN 2

Line 1, "another" should read --other--.
    Line 19, "such a" should read --such as--.

COLUMN 7

Line 22, "as infrared" should read --an infrared--.
    Line 31, "colorant" should read --colorants--.
    Line 51, "is" should read --are--.
    Line 56, "polyurethans," should read --polyurethanes,--.
    Line 62, "like," should read --the like,--.

COLUMN 9

Line 67, "optical elements" should read --optical element--.

COLUMN 10

Line 48, "type a" should read --type and a--.
    Line 49, "an" should be deleted.

UNITED STATES PATENT AND TRADEMARK OFFICE
CERTIFICATE OF CORRECTION

PATENT NO. : 4,832,466
DATED : May 23, 1989
INVENTOR(S) : YUKUO NISHIMURA, ET AL.   Page 2 of 5

It is certified that error appears in the above-identified patent and that said Letters Patent is hereby corrected as shown below:

COLUMN 11

Line 42, "agent" should read --agents--.

COLUMN 12

Line 3, "opaque" should read --opaque.--.
    Line 54, "saved." should read --reduced.--.
    Line 63, "Gd.Tb.Fe (gadolinium.terbium iron)" should read --Gd.Tb.Fe (gadolinium.terbium.iron)--.
    Line 64, "Åthick" should read --Å thick--.

COLUMN 14

Line 46, "persulfate 30m" should read --persulfate 30mg--.
    Line 52, "transparent protective plate 12" should read --transparent protective plate 13--.

COLUMN 15

Line 8, "saved." should read --reduced.--.

COLUMN 16

Line 7, "transparent protective plate 3," should read --transparent protective plate 13,--.
    Line 11, "12" should read --13--

UNITED STATES PATENT AND TRADEMARK OFFICE
CERTIFICATE OF CORRECTION

PATENT NO. : 4,832,466
DATED : May 23, 1989
INVENTOR(S) : YUKUO NISHIMURA, ET AL.

It is certified that error appears in the above-identified patent and that said Letters Patent is hereby corrected as shown below:

COLUMN 17

Line 22, "was" should be deleted.
Line 38, "be" should read --can be--.
Line 50, "cold setting epoxy resin." should read --cold-setting epoxy resin.--.

COLUMN 18

Line 1, "abovementioned" should read --above-mentioned--.
Line 6, "cold setting epoxy resin." should read --cold-setting epoxy resin.--.
Line 34, "corresponding" should read --corresponding to--.

COLUMN 19

Line 3, "a heat" should read --heat--.
Line 4, "generating" (first occurrence) should read --generated--.
Line 31, "lapses," should read --elapses,--.

COLUMN 20

Line 45, "At" should read --In--.

UNITED STATES PATENT AND TRADEMARK OFFICE
CERTIFICATE OF CORRECTION

PATENT NO. : 4,832,466
DATED : May 23, 1989
INVENTOR(S) : YUKUO NISHIMURA, ET AL.  Page 4 of 5

It is certified that error appears in the above-identified patent and that said Letters Patent is hereby corrected as shown below:

COLUMN 22

Line 7, "consists" should read --conjugated--.
Line 34, "tive heater" should read --tive member--.
Line 60, "support 105'" should read --support 105',--.

COLUMN 23

Line 6, "reside" should read --resides--.
Line 28, "as" (first occurrence) should read --an--.
Line 49, "V1i, V2i, ... V6i" should read
--V11, V21, ... V51-- and "(i=1-3)" should be deleted.
Line 56, "as" should read --an--.

COLUMN 25

Line 45, "arranges" should read --arranged--.
Line 48, "resistive member" (second occurrence) should read --resistive members--.
Line 64, "member" should read --members--.

COLUMN 26

Line 15, "lens 166," should read --lens 146,--.
Line 27, "produce" should read --produces--.
Line 51, "self modulation," should read --self-modulation,--.

UNITED STATES PATENT AND TRADEMARK OFFICE
CERTIFICATE OF CORRECTION

PATENT NO. : 4,832,466

DATED : May 23, 1989

INVENTOR(S) : YUKUO NISHIMURA, ET AL.   Page 5 of 5

It is certified that error appears in the above-identified patent and that said Letters Patent is hereby corrected as shown below:

COLUMN 27

Line 14, "projecting" should read --project--.

COLUMN 28

Line 5, "or micron." should read --of microns.--.
Line 33, "ketons," should read --ketones,--.
Line 34, "eted" should read --ated--.
Line 49, "$10^{-5}$ to $10^{-2}$" should read --$10^{-5}$ to $10^{-2}$M--.

Signed and Sealed this

Twelfth Day of June, 1990

Attest:

HARRY F. MANBECK, JR.

*Attesting Officer*   Commissioner of Patents and Trademarks